(12) United States Patent
Han et al.

(10) Patent No.: US 8,892,047 B2
(45) Date of Patent: *Nov. 18, 2014

(54) COMMUNICATION TERMINAL FOR CHANGING CHANNEL AND CHANNEL CHANGING METHOD THEREOF

(75) Inventors: Sang-Min Han, Hwaseong-si (KR); Young-hwan Kim, Hwaseong-si (KR); Mi-hyun Son, Seoul (KR); Seong-soo Lee, Suwon-si (KR)

(73) Assignee: Samsung Electronics Co., Ltd., Sowen-Si (KR)

( * ) Notice: Subject to any disclaimer, the term of this patent is extended or adjusted under 35 U.S.C. 154(b) by 649 days.

This patent is subject to a terminal disclaimer.

(21) Appl. No.: 11/606,140

(22) Filed: Nov. 30, 2006

(65) Prior Publication Data

US 2007/0264937 A1 Nov. 15, 2007

(30) Foreign Application Priority Data

May 11, 2006 (KR) .................. 10-2006-0042542

(51) Int. Cl.
- *H04B 1/00* (2006.01)
- *H04B 1/38* (2006.01)
- *H04B 17/00* (2006.01)

(52) U.S. Cl.
CPC ............... *H04B 1/385* (2013.01); *Y02B 60/50* (2013.01); *H02M 1/6066* (2013.01); *H04B 17/0077* (2013.01); *H04B 17/0045* (2013.01); *H04B 2001/3866* (2013.01)
USPC ......................................... 455/63.3; 455/41.2

(58) Field of Classification Search
CPC ................. H04B 17/0045; H04B 17/0077
USPC ............ 455/41.2, 62, 63.3, 437, 67.13, 553.1
See application file for complete search history.

(56) References Cited

U.S. PATENT DOCUMENTS 5,867,766 A * 2/1999 Dinc et al. .................. 455/62
6,185,423 B1 2/2001 Brown et al.
(Continued)

FOREIGN PATENT DOCUMENTS

| JP | 10-504698 A | 5/1998 |
| JP | 2004-312766 A | 11/2004 |

(Continued)

OTHER PUBLICATIONS

Office Action dated Dec. 7, 2010 from the Japanese Patent Office in Japanese counterpart application No. 2009-509400.

(Continued)

*Primary Examiner* — David Bilodeau
(74) *Attorney, Agent, or Firm* — Sughrue Mion, PLLC

(57) ABSTRACT

A wireless communication terminal capable of changing a channel, and a channel changing method of the wireless communication terminal. The wireless communication terminal generates a plurality of channels by dividing at least part of a frequency band for ultra-wideband communications into a plurality of frequency sub-bands, receives a radio signal in at least one of the plurality of the channels, and changes a channel for receiving the radio signal. Accordingly, high quality communications are feasible between the transmitter terminal and the receiver terminal in an optimized channel environment, and signal interference between the receiver terminals connected to different transmitter terminals can be prevented. Additionally, it is possible to carry out the channel change rapidly and efficiently and to reduce the power consumption required to transmit and receive radio signals comprising a chaotic carrier signal.

17 Claims, 6 Drawing Sheets

(56) References Cited

U.S. PATENT DOCUMENTS

| | | |
|---|---|---|
| 7,089,033 B2 * | 8/2006 | Leinonen et al. .......... 455/553.1 |
| 7,263,333 B2 * | 8/2007 | Roberts ...................... 455/67.13 |
| 2005/0255878 A1 | 11/2005 | Leinonen et al. |

FOREIGN PATENT DOCUMENTS

| | | |
|---|---|---|
| KR | 2001-0011833 A | 2/2001 |
| KR | 10-2005-0026041 A | 3/2005 |
| WO | 96/06490 A1 | 2/1996 |
| WO | 2004/012465 A2 | 2/2004 |

OTHER PUBLICATIONS

Chinese Office Action issued Jul. 26, 2011 in corresponding Chinese Application No. 200780008730.4.

* cited by examiner

A COMMUNICATION TERMINAL FOR CHANGING CHANNEL AND CHANNEL CHANGING METHOD THEREOF

CROSS-REFERENCE TO RELATED APPLICATIONS

This application claims priority from Korean Patent Application No. 10-2006-0042542 filed on May 11, 2006 in the Korean Intellectual Property Office, the disclosure of which is incorporated herein by reference.

BACKGROUND OF THE INVENTION

1. Field of the Invention

Methods and apparatuses consistent with the present invention relate to a wireless communication terminal capable of changing channels and a channel changing method thereof. More particularly, methods and apparatuses consistent with the present invention relate to a wireless communication terminal capable of changing a communication channel according to environment during the wireless communications so as to avoid interference between receiver terminals and ensure good communication performance, and a communication channel changing method of the wireless communication terminal.

2. Description of the Related Art

Short distance radio communication standards, such as Bluetooth technology, have recently attracted a lot of attention from the wireless communication industry. Bluetooth, for example, allows bidirectional wireless communications among digital devices in real time by wirelessly connecting mobile phones, computers, and personal digital assistants (PDA) with other phones, computers, PDA's, and appliances in homes or offices which are within 10~100 m of each other. Frequency bands of Bluetooth range from 2.402~2.480 GHz which corresponds to the Industrial, Scientific, and Medical (ISM) bands of 2.4 GHz.

When a transmitter terminal and a receiver terminal communicate with each other wirelessly through Bluetooth technology, the pair of the transmitter terminal and the receiver terminal can be a mobile terminal and a wireless headset, a computer and a wireless headset, a computer and a peripheral, and the like.

Since interference between the receiver terminals is possible at a short distance, Bluetooth uses a frequency hopping method which is a kind of spread spectrum method. The frequency hopping method, which changes the frequencies at random, defines 79 frequency bands by dividing the frequency bandwidth by 1 MHz in the Bluetooth band of 2.402~2.480 GHz and converts frequency bands to transmit signals in order to prevent interference between the receiver terminals. The frequency band conversion is carried out 1600 times per one second.

Usually, one receiver terminal is connected to one transmitter terminal for radio communications. At the initial communication, the transmitter terminal matches the channel between the transmitter terminal and the receiver terminal by sending radio signals to the receiver terminal in a preset channel. The channel is a kind of code formed through the frequency hopping, and the channel can be set based on the order in which the 79 frequency bands are converted. For instance, if the divided frequency bands are referred to as $1^{st}$ through $79^{th}$ bands, the channel 1 can sequentially hop the $1^{st}$ through $79^{th}$ bands, and the channel 2 can hop through the $5^{th}$ band, the $29^{th}$ band, the $17^{th}$ band, and the $3^{rd}$ band.

Additionally, besides advancements in short distance radio communication, ultra-wideband wireless communication is also under development using the ultra-wideband frequency band of 3.1~5.1 GHz. The ultra-wideband wireless communication transmits and receives communication signals primarily using on-off keying (OOK) modulation which transmits and receives digital signals as ON and OFF. When the OOK modulation is adapted, to prevent the interference with other transmitter terminals, multiple channels are generated by dividing the frequency band of 3.1~5.1 GHz to a plurality of frequency bands and the transmitter terminal and the receiver terminal communicate with each other using the selected channel of the divided bands. However, in the case that a transmitter terminal 1 and a receiver terminal 1 wirelessly communicate with each other using an arbitrary channel and a transmitter terminal 2 and a receiver terminal 2 enter communications using the same arbitrary channel within the interference range, radio communication failure occurs both between the transmitter terminal 1 and the receiver terminal 1 and between the transmitter terminal 2 and the receiver terminal 2.

Problems in the OOK scheme arise when the same channel is used by more than one pair of terminals to communicate with each other. To prevent this, when another transmitter terminal and another receiver terminal enter the radio communication range being used by a transmitter terminal and a receiver terminal, the channel can be changed automatically.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, the present invention has been provided to address the above-mentioned and other problems and disadvantages occurring in the related arrangement. An aspect of the present invention is to provide a wireless communication terminal capable of changing a channel to avoid interference between communication terminals and ensure good communication performance, and a channel changing method of the wireless communication terminal.

According to an aspect of the present invention, a wireless communication terminal generates a plurality of channels by dividing at least part of a frequency band for ultra-wideband communications into a plurality of frequency sub-bands, receives a radio signal in at least one of the plurality of the channels, and changes a channel for receiving the radio signal.

The wireless communication terminal may include a power sensor which detects a power level of the radio signal received from outside.

The wireless communication terminal may include a filter which changes the channel by adjusting a filtered band of the radio signal.

The filter may be a band pass filter.

The wireless communication terminal may include a controller which controls whether to change the channel according to a power level of the radio signal received from outside.

The controller may change the channel by generating a control signal which varies the filtered band of the filter when the power level of the received radio signal is below a certain level.

The controller may change the channel by generating a control signal which varies the filtered band of the filter when the radio signal is not received from outside within a preset time.

The radio signal may be a chaotic signal having a plurality of frequency components in an ultra-wideband frequency band.

A guard band, in which the radio signal is not transmitted and received, may be generated with a certain width between neighboring channels.

The wireless communication terminal may be, for example, one of the following: a portable terminal, a computer, a MPEG-1 Audio Layer 3 (MP3) player, a Radio Frequency (RF) transceiver, a television (TV), a Personal Music Player (PMP), a PDA, a wireless headset, a wireless mouse, and a computer peripheral.

The radio signal may be received, for example, from one of the following: a portable terminal, a computer, a MP3 player, a RF transceiver, a TV, a PMP, a PDA, a wireless headset, a wireless mouse, a computer peripheral, and a speaker.

According to another aspect of the present invention, a channel changing method of a wireless communication terminal includes generating a plurality of channels by dividing at least part of a frequency band for ultra-wideband communications to a plurality of frequency sub-bands, and transmitting a radio signal from a transmitter terminal to a receiver terminal by selecting one of the channels; determining communication state of the channel by detecting energy of the radio signal; determining whether to change the channel according to the communication state; and transmitting and receiving radio signals in the determined channel.

BRIEF DESCRIPTION OF THE DRAWING FIGURES

The above and other aspects, features, and advantages of the present invention will become more apparent and more readily appreciated from the following description of exemplary embodiments thereof, with reference to the accompanying drawings, in which.

DETAILED DESCRIPTION OF THE EXEMPLARY EMBODIMENTS

Figure 1:
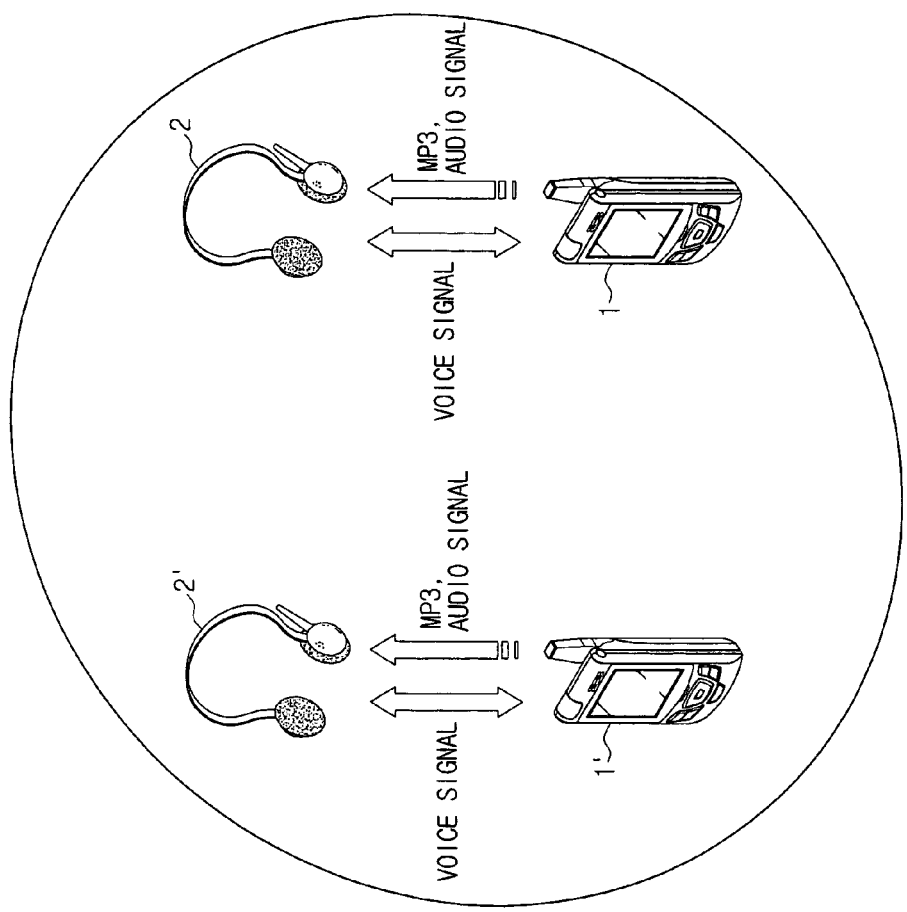
FIG. 1 is a diagram showing data transmission and reception between a plurality of pairs of a portable terminal and a wireless headset having a wireless communication system.

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are merely provided as examples to assist those of ordinary skilled in the art in a comprehensive understanding of the invention. Also, well-known functions or constructions are not described in detail, since they would obscure the invention in unnecessary detail.

A wireless communication terminal of the present invention can wirelessly transmit and receive data using a chaotic signal, and can automatically search and select a channel which is unused for communications between a transmitter terminal and a receiver terminal. Herein, the chaotic signal is a kind of carrier signal having plural frequency components in a certain frequency band, and generated directly in a frequency band to transmit a data signal.

The transmitter terminal of the wireless communication terminals can employ a portable terminal, a computer, an MP3 player, an RF transceiver, a TV, a PMP player, a PDA, a wireless headset, a wireless mouse, a computer peripheral, and so forth. The receiver terminal can employ a portable terminal, a computer, an MP3 player, an RF transceiver, a TV, a PMP, a PDA, a wireless headset, a wireless mouse, a computer peripheral, a speaker, and so forth.

In an exemplary embodiment of the present invention, the transmitter terminal is a portable terminal and the receiver terminal is a wireless headset. It should be understood that the wireless communication system of the present invention is applicable to all other devices capable of carrying out short-distance wireless communications.

FIG. 1 is a diagram showing data transmission and reception between a plurality of pairs of a portable terminal and a wireless headset having a wireless communication system.

The first portable terminal 1 is communicable with a second portable terminal 1' or a server. The first portable terminal 1 outputs a data signal provided from a base station through a screen and a speaker, or stores the data signal.

The first wireless headset 2 communicates with the first portable terminal 1 via radio signals such as an MPEG-1 audio layer-3 (MP3) signal, an audio signal, and a voice signal through short-distance radio communications. The communications between the first wireless headset 2 and the first portable terminal 1 are bidirectional or unidirectional depending on the data type.

For instance, in a case where the first portable terminal 1 is used for a telephone call, the voice signal received at the first portable terminal 1 is forwarded to the first wireless headset 2 and output through the speakers. Voice input through the microphone of the first wireless headset 2 is converted to a radio signal, provided to the first portable terminal 1, and then transmitted to the base station. That is, the voice signal is transmitted and received bidirectionally between the first portable terminal 1 and the first wireless headset 2 during a telephone call. By contrast, data which is stored to the first portable terminal 1 or provided via wireless Internet, for example, MP3-compressed audio data is provided only from the first portable terminal 1 to the first wireless headset 2, that is, unidirectionally.

While the pair of the first portable terminal 1 and the first wireless headset 2 is communicating in a certain channel, if a second portable terminal 1' and a second wireless headset 2' enter the same channel within the radio communication range, interference occurs. As a result, receiving communication signals by the first wireless headset 2 and the second wireless headset 2' becomes impossible. The communication interference can be avoided by changing the channel of the first portable terminal 1 or the second portable terminal 1'.

To enable the channel change, the first portable terminal 1, the second portable terminal 1', the first headset 2, and the second headset 2' need to have a radio communication system as described below in exemplary embodiments of the present invention.

Figure 2:
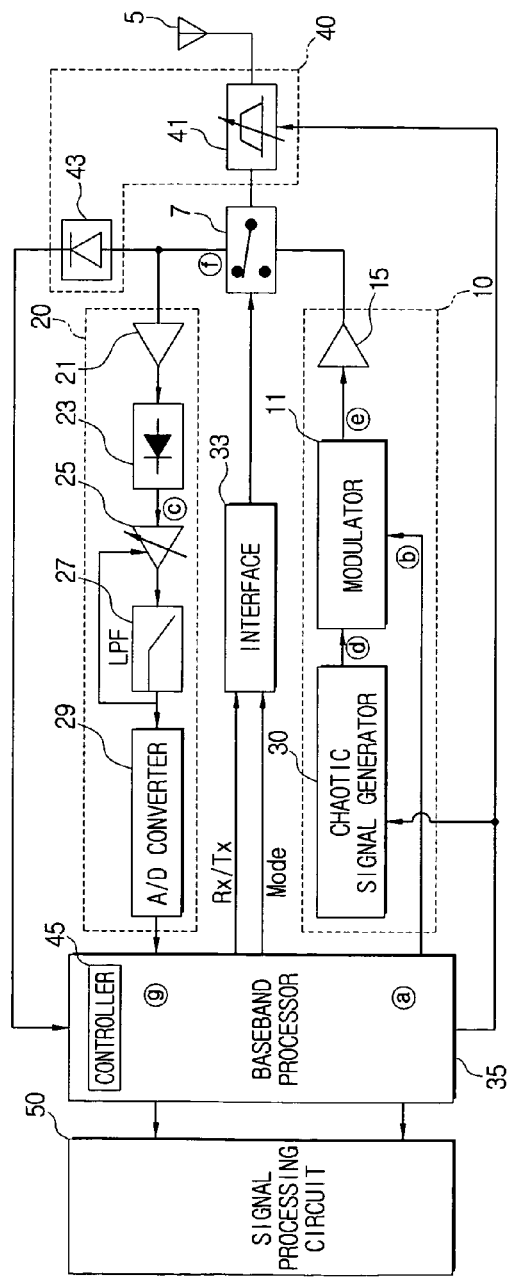
FIG. 2 is a block diagram of a wireless communication system using a chaotic signal, which is mounted to the portable terminal according to an exemplary embodiment of the present invention.
Figure 2:
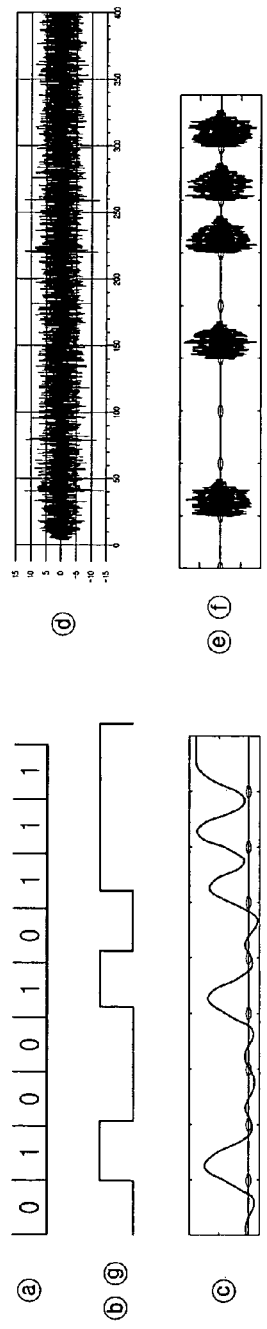

FIG. 2 is a block diagram of a wireless communication system using a chaotic signal, which is mounted to the portable terminal 1 according to an exemplary embodiment of the present invention.

The wireless communication system of the portable terminal 1 includes a channel changing circuit 40 for changing the channel, a transmission circuit 10 for transmitting a chaotic carrier acquired by modulating the data signal to the chaotic signal, and a reception circuit 20 which receives the chaotic carrier and evaluates the data signal.

Figure 3:
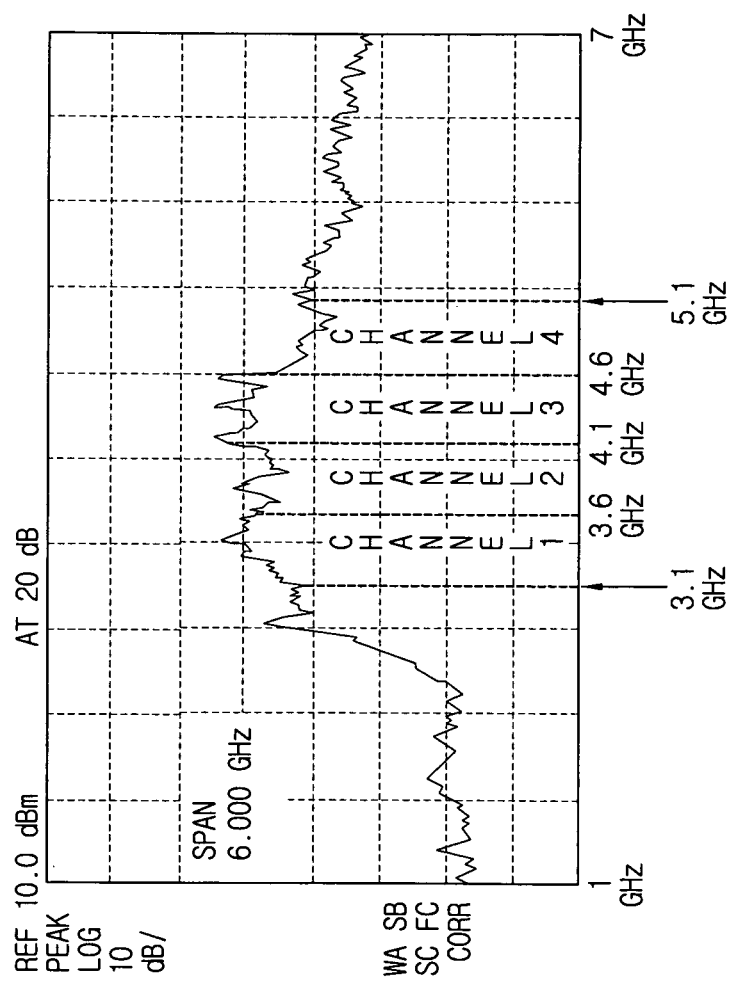
FIG. 3 is a graphical representation of channel division in which a channel is set in the ultra wide frequency band according to an exemplary embodiment of the present invention.

In the ultra-wideband wireless communication system, the chaotic signal is generated to have a plurality of frequency components throughout 3.1~5.1 GHz band as shown in FIG. 3. Since the frequency band of the chaotic signal covers a wide range, the frequency bands may be divided into a plurality of sub-bands and only parts of the sub-bands can be used for transmission and reception of the communication signals. For instance, when the frequency band of the chaotic signal is divided by 500 MHz, four frequency sub-bands are obtained and set to four channels. In more detail, 3.1~3.6 GHz is set to the channel 1, 3.6~4.1 GHz is set to the channel 2, 4.1~4.6 GHz is set to the channel 3, and 4.6~5.1 GHz is set to the channel 4. Accordingly, the frequency band of the chaotic signal has four channels, and the first portable terminal 1 and the wireless headset 2 can communicate with each other using one of the four channels. It should be appreciated by one of ordinary skill in the art that the number of the channels and the width of the frequency band channel may vary by the designer and according to the communication efficiency desired.

To prevent the signal interference between neighboring channels, a guard band (not shown) is formed. When the channels are divided by 500 MHz as above, the guard band can range from 1 to 100 MHz. It is noted that the designer can define the width of the guard band to the optimum size to prevent the signal interference.

The channel changing circuit 40 is disposed among an antenna 5, the transmission circuit 10, and the reception circuit 20 to change the communication channel of the portable terminal 1 and the wireless headset 2. The channel changing circuit 40 includes a filter 41 for the channel change, and a power sensor 43 which detects a power level of the chaotic signal received from the wireless headset 2. The filter 41 is controlled by a controller 45 which receives the result from the power sensor 43, and the channel changing circuit 40 changes the channel based on the result from the power sensor 43.

The filter 41 permits the transmission and the reception of the chaotic signal only in the frequency band corresponding to a pre-selected channel by filtering the chaotic signal transmitted or received via the antenna. The filter 41 may employ a tunable band pass filter (BPF). The tunable BPF 41 can not only filter and pass the intended frequency band but also change the filtered frequency band. Hence, it is possible to generate the plurality of channels having the intended frequency bandwidth and change the channel by adjusting the filtered band of the BPF 41.

The power sensor 43 detects the power level of the chaotic signal which is transmitted to the portable terminal 1 from the wireless headset 2 in the communications between the portable terminal 1 and the wireless headset 2. The power sensor 43 can be implemented using a diode. The power sensor 43 is disposed between a switch 7 of the reception circuit 20 and the controller 45. The power sensor 43 applies the sensed power level of the chaotic signal to the controller 45.

The controller 45 discriminates available and unavailable channels by scanning the channels being used in the wireless communication range at the initial communication, and then selects a channel to transmit the chaotic signal according to the result of the determination. In other words, the controller 45 prevents the interference between the portable terminals 1 and 1' by making the first portable terminal 1 avoid the channel used by the second portable terminal 1' when the portable terminal 1 enters the wireless communication range.

Also, the controller 45 generates a signal for controlling the channel change of the filter 41 based on the power level of the chaotic signal detected at the power sensor 43 and whether the chaotic signal is received from the wireless headset 2.

More specifically, when the power level of the chaotic signal detected at the power sensor 43 is below a preset power level, the controller 45 sends a control signal instructing to change the filtered frequency band to the BPF 41. When the chaotic signal is not received from the wireless headset 2 within a preset time, the controller 45 applies a control signal instructing to change the filtered frequency band to the BPF 41. Accordingly, the frequency band filtered by the BPF 41 is changed and thus the communication channel is changed. At this time, the controller 45 may change the channel according to a certain rule or at random. For instance, depending on the magnitude of the frequency band, the controller 45 may control to change the channel in sequence of channel 1, channel 2, channel 3, . . . , or in order of channel 3, channel 2, channel 4, channel 1.

Besides the initial communication, during the communications between the portable terminal 1 and the wireless headset 2, the controller 45 continually monitors the power level of the chaotic carrier received from the wireless headset 2. When the power level falls below the preset level, the controller 45 controls the BPF 41 to change the channel in real time.

Note that the controller 45 can be provided separately or in a baseband processor 35, and that the baseband processor 35 can function as the controller 45.

Meanwhile, the switch 7 is provided at one end of the wireless communication system of the portable terminal 1, facing the wireless headset 2, to interconnect a transceiver antenna 5 with one of the transmission circuit 10 and the reception circuit 20. The BPF 41 of the channel changing circuit 40 is interposed between the antenna 5 and the switch 7.

At the other end of the wireless communication system, a signal processing circuit 50 for processing a CDMA signal, the baseband processor 35 for packetizing data bits, and an interface 33 for controlling the operation of the switch 7 under control of the controller 45 are provided.

The transmission circuit 10 includes a chaotic signal generator 30, a modulator 11, and a power amplifier 15. The transmission circuit 10 serves to process voice signals, MP3 signals, or audio signals processed at the signal processing circuit 50 and transmit it to the wireless headset 2. In doing so, the signal processing circuit 50 supplies the audio signal as data bits or data signal to the baseband processor 35, and the baseband processor 35 packetizes the data bits or the data signal and applies it to the modulator 11.

The chaotic signal generator 30 generates the chaotic signal having a plurality of frequency components in the preset frequency band. The chaotic signal is generated with the successive pulses having different cycles and amplitudes in view of the time domain as shown in the graph as to the point ⓓ in FIG. 2. The frequency band of the chaotic signal may vary according to the design of the chaotic signal generator 30. In the wireless communication system of the present invention, the chaotic signal is generated in the frequency band of 3.1~5.1 GHz which is the ultra wideband. As such, since the chaotic signal is generated in the ultra wideband, the channel division is feasible.

The modulator 11 generates the chaotic carrier by synthesizing the chaotic signal generated at the chaotic signal generator 30 with the data signal. The binary data bits of 0s and 1s as shown in the graph as to the point ⓐ are supplied to the modulator 11 as pulses as shown in the graph as to the point ⓑ. When the data signal and the chaotic signal are synthesized, the chaotic carrier is generated such that the chaotic signal is present only in the information areas of the data signal as shown in the graph as to the point ⓔ. Even after the modulation is completed, the frequency band of the chaotic carrier is the same as the frequency band of the chaotic signal.

When the transmission circuit 10 operates, the interface 33 controls the switch 7 to connect the transmission circuit 10 to the antenna 5. The chaotic carrier generated at the transmission circuit 10 is filtered at the BPF 41 and then transmitted to the wireless headset 2 via the antenna 5.

The reception circuit 20 includes a low noise amplifier (LNA) 21, a signal sensor 23, an automatic gain control (AGC) amplifier 25, a LPF 27, and an analog-to-digital (A/D) converter 29. The reception circuit 20 is responsible to receive and process the data signal which is wirelessly input from the wireless headset 2. Herein, the data signal can not only be the voice data signal or the audio data signal but also a control signal for the transmitter terminal to control the receiver terminal. The data signal is not limited to a specific data signal.

The LNA 21 amplifies the chaotic carrier received via the antenna 5 and provides the amplified chaotic carrier to the signal sensor 23.

The signal sensor 23 extracts the data signal by detecting the envelop of the chaotic carrier. The signal sensor 23 may be implemented using a diode. The chaotic carrier which passes through the signal sensor 23 is shaped into the curved waveform as shown in the graph as to the point ⓒ.

The AGC amplifier 25, which is capable of increasing or decreasing the gain, amplifies the waves extracted at the signal sensor 23 to certain levels. The LPF 27 filters the amplified waves to convert them to the digital signal at the A/D converter 29.

The A/D converter 29 extracts the pulsed data signal by converting the curved waveform to the digital signal.

The data signal is applied to the signal processing circuit 50 via the baseband processor 35, processed to the CDMA signal, and then transmitted to the base station.

Although the portable terminal of FIG. 2 has both the transmission circuit 10 and the reception circuit 20 therein, a wireless earphone, for example, may have only the reception circuit 20. In other words, a wireless communication device can selectively include both or one of the transmission circuit 10 and the reception circuit 20.

Figure 4:
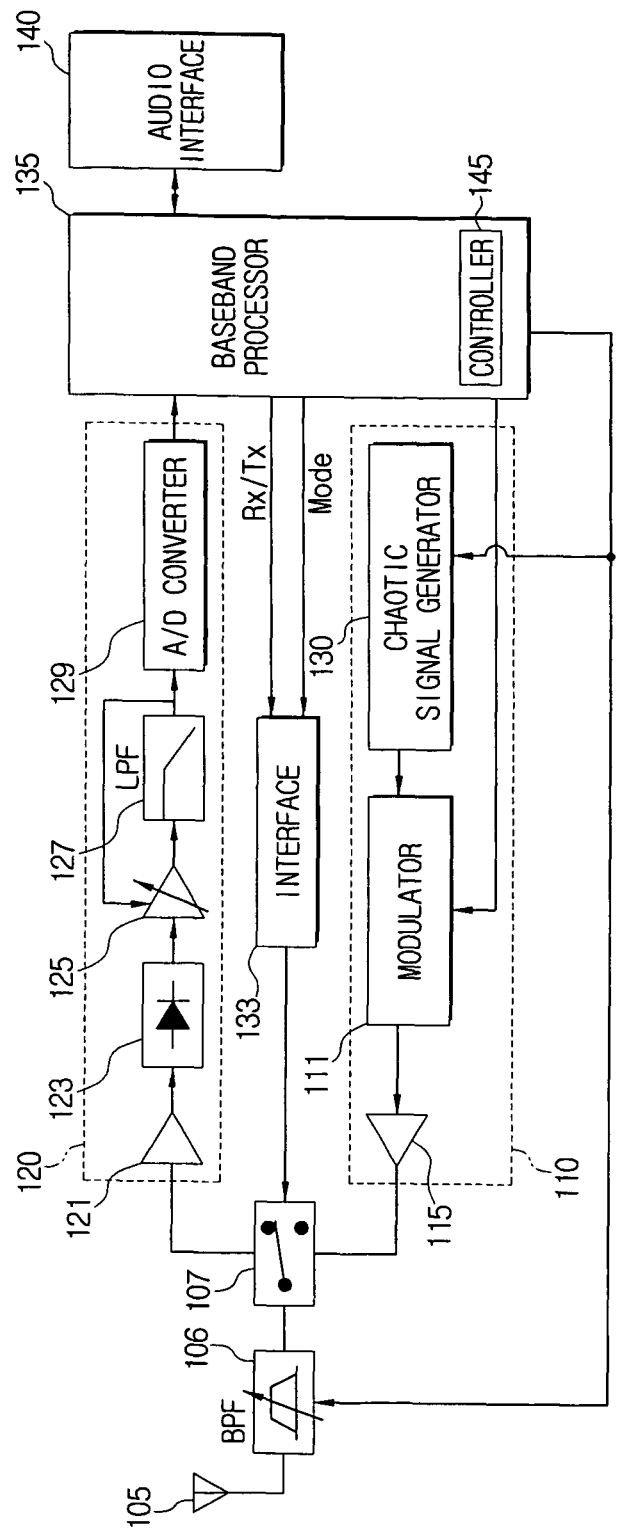
FIG. 4 is a block diagram of a wireless communication system installed to a wireless headset according to an exemplary embodiment of the present invention.

FIG. 4 is a block diagram of a wireless communication system installed to a wireless headset according to an exemplary embodiment of the present invention.

As shown in FIG. 4, the wireless communication system of the wireless headset 2 includes a reception circuit 120 and a transmission circuit 110, similar to the wireless communication system of the portable terminal 1.

The reception circuit 120 includes a LNA 121, a signal sensor 123, an AGC amplifier 125, a LPF 127, and an A/D converter 129. The reception circuit 120 is responsible to extract and output the radio signal from the chaotic carrier received from the portable terminal 1.

The transmission circuit 110 includes a chaotic signal generator 130, a modulator 111, and a power amplifier 115. The transmission circuit 110 is responsible to synthesize the voice signal input to the microphone with the chaotic signal and transmit the synthesized signal to the portable terminal 1.

An antenna 105, a switch 107, and a BPF 106 are provided at one end, facing the portable terminal 1, of the wireless communication system of the wireless headset 2. Herein, the BPF 106 is set to filter only the frequency band corresponding to the channel which is set by the BPF 41 of the portable terminal 1, and the channel is changed according to the signal from the controller 145. In the initial operation, the BPF 106 is set to transmit and receive all frequency bands of the chaotic carrier. The controller 145 determines whether the chaotic carrier is input while changing the channels sequentially or randomly.

When the chaotic carrier is input in an arbitrary channel at the initial communication and identification (ID) of the wireless headset 2 is requested, the controller 145 transmits the ID in the corresponding channel. In doing so, when the portable terminal 1 wants the wireless communication in the corresponding channel, the chaotic carrier containing data is provided in the corresponding channel and the controller 145 controls the BPF 106 to set the channel of the wireless headset 2 corresponding to the channel of the chaotic carrier containing the data from the portable terminal 1. In case that the power of the channel is below a certain level in the initial communication, the portable terminal 1 re-requests the ID by changing the channel and the controller 145 detects the chaotic carrier from the portable terminal 1 by changing the channel. That is, the controller 145 changes the channel until the chaotic carrier containing the data from the portable terminal 1 is received.

When one-way data is transmitted from the portable terminal 1 to the wireless headset 2, that is, when MP3 or audio data signals are transmitted, the controller 145 applies a signal to the portable terminal 1 to acquire the power level of the channel at intervals during the communications between the portable terminal 1 and the wireless headset 2. This is done to prepare for the change of the channel environment during the communications between the portable terminal 1 and the wireless headset 2. The portable terminal 1 is able to change the channel according to the channel states by receiving the corresponding signal from the wireless headset 2. By contrast, when two-way data is transmitted between the portable terminal 1 and the wireless headset 2, that is, in case of the telephone call, the portable terminal 1 acquires the channel state using the chaotic carrier received from the wireless headset 2. Thus, the wireless headset 2 needs not transmit an additional signal to the portable terminal 1.

At the other end of the wireless communication system, a baseband processor 135 for packetizing data bits, an interface 133 for controlling the switch 107 under control of the controller 145, and an audio interface 140 are provided.

The reception circuit 120, the transmission circuit 110, and the other components of wireless headset 2 carry out the same functions as the components of the wireless communication system of the portable terminal 1. Only the types of the processed data signals are different. Hence, further explanation thereof will be omitted for brevity.

Figure 5A:
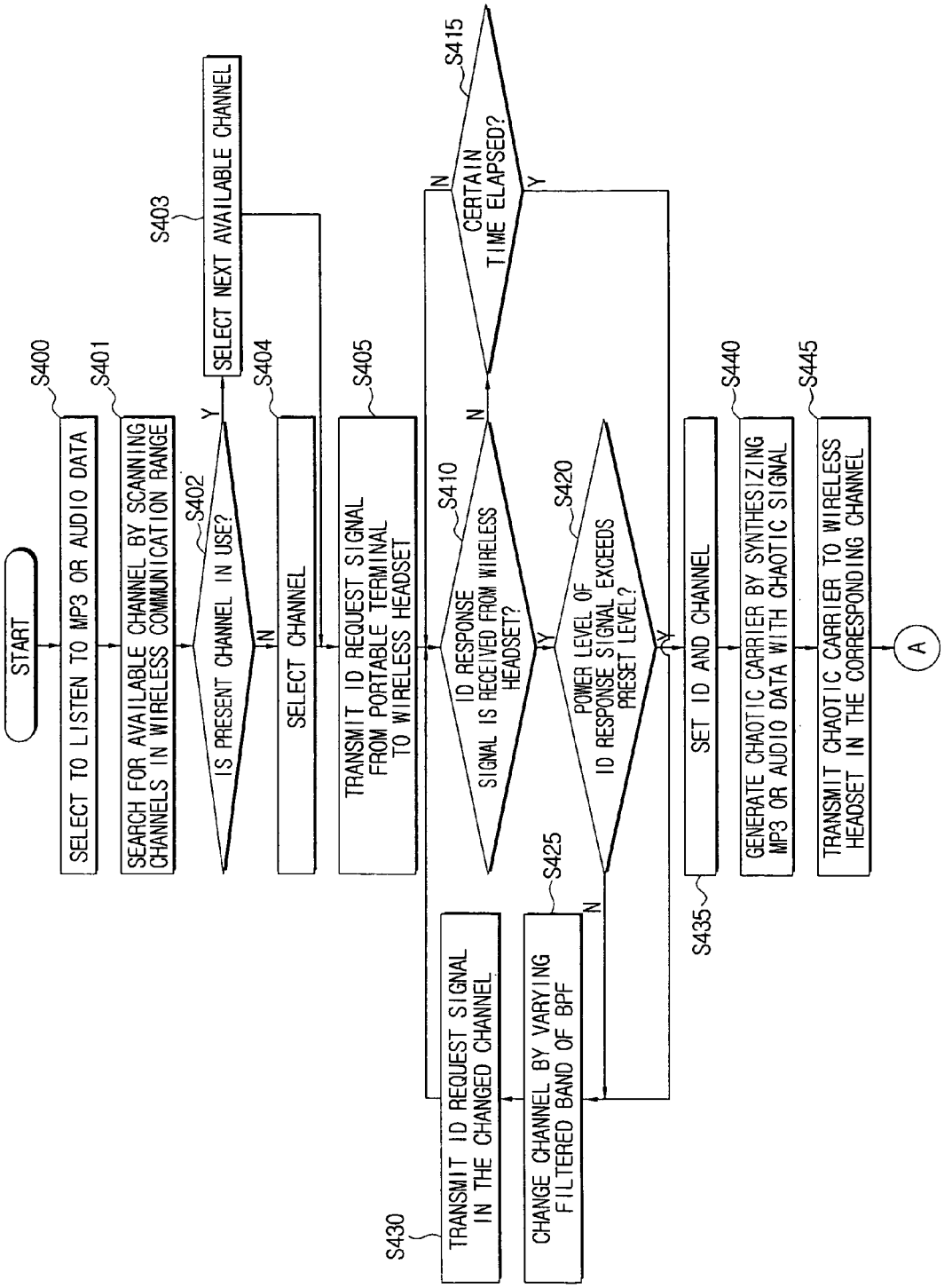
FIGS. 5A and 5B are flowcharts illustrating the process of setting and changing a channel between a portable terminal and a wireless headset having a wireless communication system according to an exemplary embodiment of the present invention.
Figure 5B:
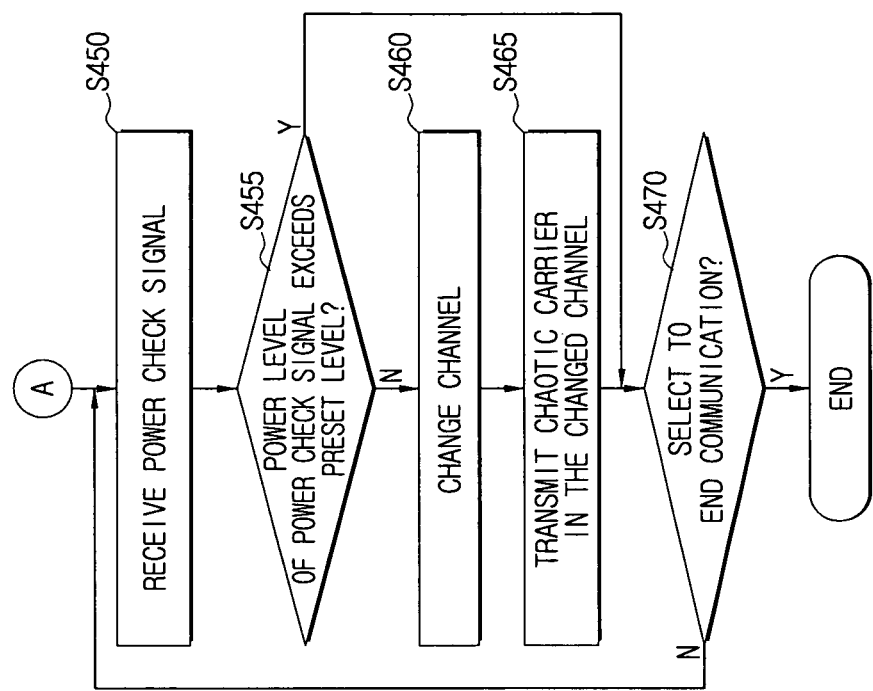

With the wireless communication systems as constructed above in an exemplary embodiment of the present invention, the channel setting between the portable terminal 1 and the wireless headset 2 are now illustrated in reference to FIG. 5A and FIG. 5B.

When a user wants to listen to MP3 or audio data which is stored to the portable terminal 1, or by accessing wireless Internet, the user selects the output of the MP3 or the audio data by manipulating buttons of the portable terminal 1 or the wireless headset 2 (S400). The portable terminal 1 checks whether there is an available channel by scanning the channels in the wireless communications range (S401). When a present channel is in use (S402-Y), the portable terminal 1 selects the next available channel (S403) and transmits an ID request signal to the wireless headset 2 in the selected channel, for example, in the channel 1 (S405). When the present channel is not in use (S402-N), the portable terminal 1 selects the present channel (S404) and transmits an ID request signal to the wireless headset 2 in the selected channel.

The wireless headset 2 determines whether the signal is received from the portable terminal 1. When the ID request signal is received by the wireless headset 2 from the portable terminal 1 through the channel 1, for example, the wireless headset 2 transmits a response signal including its ID to the portable terminal 1.

The controller 45 of the portable terminal 1 determines whether the ID response signal is received from the wireless headset 2 (S410). When the ID response signal is not received, the controller 45 determines whether a preset time elapses (S415). After the preset time, the controller 45 generates a control signal to vary the filtered band of the BPF 41 and applies the control signal to the BPF 41 (S425). When the BPF 41 changes the channel, the ID request signal is re-transmitted in the changed channel.

In contrast, when the ID response signal is received from the wireless headset 2, the controller 45 checks whether the power level of the ID response signal detected by the power sensor 43 exceeds a preset level. When the power level of the ID response signal exceeds the preset level, the controller 45 sets the corresponding ID and the corresponding channel (S435). Next, the controller 45 operates the chaotic signal generator 30 and the modulator 11 to generate the chaotic carrier by synthesizing the MP3 or audio data with the chaotic signal (S440). The chaotic carrier is transmitted to the wireless headset 2 through the corresponding channel (S445).

When the power level of the ID response signal does not exceed the preset level, the controller 45 generates a control signal to vary the filtered band of the BPF 41 and applies the control signal to the BPF 41 (S425). The controller 45 re-transmits the ID request signal in the channel which is changed by the BPF 41 (S430).

Operations S410 through S430 are repeated until the power level of the ID response signal exceeds the preset level.

In the mean time, when the channel is set and the chaotic carrier containing the data is received from the portable terminal 1, the wireless headset 2 transmits a power check signal to inform the channel state of the wireless headset 2 at intervals.

Upon receiving the power check signal from the wireless headset 2 (S450), the controller 45 of the portable terminal 1 determines whether the power level of the power check signal exceeds a preset level (S455). When the power level does not exceed the preset level, the controller 45 changes the channel by operating the BPF 41 (S460) and transmits the chaotic carrier in the changed channel (S465). If the user decides to end the communication (S470-Y), the communications are terminated. Otherwise (S470-N), operations S450 through S470 are repeated during the communications so as to cope with the change of the channel environment in real time.

During the telephone call between the portable terminal 1 and the wireless headset 2, the portable terminal 1 can determine the power level of the corresponding channel by virtue of the chaotic carrier containing the voice which is received from the wireless headset 2.

As such, in the wireless communication system, the chaotic signal which is the high frequency signal of the wide band, is divided into the plurality of the channels and the chaotic carrier is transmitted and received in the divided channels. Since the channel is changeable based on the channel state in real time, high quality communications are feasible between the portable terminal 1 and the wireless headset 2 in the optimized channel environment.

In specific, when the plurality of the pairs of the portable terminal 1 and the wireless headset 2 is positioned using the same channel within the arbitrary wireless communication range, the signal interference between the portable terminals can be prevented by changing the channel in real time.

The channel change can be achieved rapidly and efficiently by sensing the power level simply using the filter 41 and the power sensor 43 and changing the channel. Also, as the frequency band for the transmission and reception of the chaotic carrier becomes narrow due to the channel division, power consumption required to transmit and receive the chaotic carrier signal may be reduced.

As set forth above, the high quality communications are feasible between the transmitter terminal and the receiver terminal in the optimized channel environment, and the signal interference with the receiver terminal connected to another transmitter terminal can be prevented. Additionally, it is possible to carry out the channel change rapidly and efficiently and to reduce the power consumption required to transmit and receive the chaotic carrier.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A wireless communication terminal comprising:
   a processor which generates a plurality of channels by dividing at least part of a frequency band for ultra-wideband communications into a plurality of frequency sub-bands,
   a receiver which receives a radio signal in at least one of the plurality of channels,
   a channel changer which changes a channel to receive the radio signal,
   a transmitter which transmits an identification (ID) request signal to another wireless communication terminal, and
   a controller which controls whether to change the channel among the plurality of channels when the radio signal is not received from outside within a preset time,
   wherein the radio signal is a chaotic signal having a plurality of frequency components in the ultra-wideband frequency band,
   wherein the controller determines whether an ID response signal is received from the another wireless communication terminal in the at least one of the plurality of channels within the preset time, in response to the ID request signal, and the transmitter re-transmits the ID request signal in the channel changed by the channel changer when the ID response signal is not received within the preset time,
   wherein the controller determines whether the ID response signal is received through a particular channel within the preset time in order to transmit and receive a signal through an optimal channel, sequentially determines whether a power level of the ID response received through the particular channel is higher than a certain level, and changes the channel by generating a control signal which varies a filtered band of a filter when the power level of the received ID response signal is below the certain level.

2. The wireless communication terminal of claim 1, comprising:
a power sensor which detects a power level of the chaotic signal.

3. The wireless communication terminal of claim 1, wherein the channel changer comprises:
the filter which changes the channel among the plurality of channels by adjusting the filtered band of the radio signal.

4. The wireless communication terminal of claim 3, wherein the filter is a band pass filter.

5. The wireless communication terminal of claim 1, wherein a guard band, in which the radio signal is not transmitted and received, is generated with a certain width between neighboring channels.

6. The wireless communication terminal of claim 1, wherein the wireless communication terminal is one of a portable terminal, a computer, an MP3 player, an RF transceiver, a TV, a PMP, a PDA, a wireless headset, a wireless mouse, and a computer peripheral.

7. The wireless communication terminal of claim 1, wherein the radio signal is received from one of a portable terminal, a computer, an MP3 player, an RF transceiver, a TV, a PMP, a PDA, a wireless headset, a wireless mouse, a computer peripheral, and a speaker.

8. A channel changing method of a wireless communication terminal, comprising:
generating a plurality of channels by dividing at least part of a frequency band for ultra-wideband communications to a plurality of frequency sub-bands, and transmitting a first radio signal from a first terminal to a second terminal by selecting one of the channels;
determining communication state of the selected channel;
determining whether to change the selected channel according to the communication state;
changing the selected channel based on the determining; and
transmitting and receiving radio signals in the changed channel,
wherein the first and second radio signals are chaotic signals having a plurality of frequency components in the ultra-wideband frequency band,
wherein the transmitting the first radio signal from the first terminal to the second terminal includes transmitting an identification (ID) request signal to the second terminal,
wherein the determining the communication state of the selected channel includes determining whether an ID response signal is received from the second terminal in the selected channel from the second terminal within the preset time, in response to the ID request signal,
wherein the ID request signal is retransmitted in the changed channel when the ID response signal is not received within the preset time,
wherein the determining the communication state of the selected channel includes determining whether the ID response signal is received through the selected channel within the preset time in order to transmit and receive a signal through an optimal channel, and sequentially determining whether a power level of the ID response received through the selected channel is higher than a certain level, and
wherein the changing the selected channel includes generating a control signal which varies a filtered band of a filter when the power level of the received ID response signal is below the certain level.

9. The channel changing method of claim 8, wherein the transmitting of the first radio signal comprises transmitting a reception request signal to the second terminal at initial communication.

10. The channel changing method of claim 8, wherein the channel is changed by adjusting the frequency band which filters the radio signal.

11. The channel changing method of claim 8, wherein the channel is changed using a band pass filter.

12. The wireless communication terminal of claim 2, wherein the controller changes the channel not only when the radio signal is not received from the outside within the preset time but also based on a comparison between the power level of the radio signal received from the outside and the certain level.

13. The channel changing method of claim 8, wherein the determining of the communication state determines the communication state of the channel by detecting a power level of the second radio signal transmitted from the second terminal to the first terminal and by comparing the power level to the certain level.

14. The wireless communication terminal of claim 1, wherein in a case where the wireless communication terminal and the other wireless communication terminal are in a one way communication, the controller receives the power level of the particular channel at an interval during the communications between the wireless communication terminal and the other wireless communication terminal.

15. The channel changing method of claim 8, wherein in a case where the wireless communication terminal and the other wireless communication terminal are in a one way communication, receiving the power level of the particular channel at an interval during the communications between the wireless communication terminal and the other wireless communication terminal.

16. The wireless communication terminal of claim 1, wherein the controller differentiates available and unavailable channels by scanning the channels being used in a wireless communication range, and selects the particular channel based on a result of the differentiation.

17. The channel changing method of claim 8, further comprising differentiating available and unavailable channels by scanning the channels being used in a wireless communication range, and selecting the particular channel based on a result of the differentiating.

* * * * *